United States Patent [19] [11] 4,007,132
Rust et al. [45] Feb. 8, 1977

[54] PROCESS FOR THE MANUFACTURE OF A CATALYST

[75] Inventors: Kurt Rust, Frankfurt am Main; Erwin Schrott, Sulzbach, Taunus; Helmut Strametz, Frankfurt am Main; Hans-Jürgen Kablitz, Liederbach, Taunus, all of Germany

[73] Assignee: Hoechst Aktiengesellschaft, Frankfurt am Main, Germany

[22] Filed: Feb. 27, 1975

[21] Appl. No.: 553,810

[30] Foreign Application Priority Data

Jan. 30, 1975 Germany .......................... 2503708
Jan. 30, 1975 Germany .......................... 2503718

[52] U.S. Cl. ............................. 252/429 B; 526/90
[51] Int. Cl.$^2$ ................................... C08F 4/64
[58] Field of Search ............................ 252/429 B

[56] References Cited

UNITED STATES PATENTS

| | | | |
|---|---|---|---|
| 2,914,515 | 11/1959 | Stuart | 252/429 B X |
| 3,029,231 | 4/1962 | van Amerongen | 252/429 B X |
| 3,058,970 | 10/1962 | Rust et al. | 252/429 B X |
| 3,394,118 | 7/1968 | Boor | 252/429 B X |
| 3,864,278 | 2/1975 | La Heij et al. | 252/429 B |

*Primary Examiner*—Patrick P. Garvin
*Attorney, Agent, or Firm*—Curtis, Morris & Safford

[57] ABSTRACT

A catalyst of high activity and stereospecificity in α-olefin polymerization is obtained by subjecting titanium trichloride, prepared from titanium tetrachloride by reduction with aluminum alkyl halides, to two thermal treatments, the second one being carried out in the presence of an dialkyl ether and a cyclopolyene, and/or after-treating the solid reaction product with an aluminum alkyl halide, optionally in the presence of a small amount of a cyclopolyene and/or an olefin.

17 Claims, No Drawings

PROCESS FOR THE MANUFACTURE OF A CATALYST

The present invention relates to a process for the manufacture of a catalyst suitable for the polymerization of α-olefins.

In the polymerization of propylene or higher α-olefins with Ziegler type catalysts there are obtained, besides the technically very interesting highly crystalline polymers, which are insoluble or sparingly soluble in the hydrocarbons used as dispersion media under the polymerization conditions, also amorphous, readily soluble polymers, and oils. According to Natta, the highly crystalline polymers have a steric configuration and are called "isotactic", while the soluble polymers are sterically disordered and are called "atactic".

The formation of isotactic and amorphous poly-α-olefins is regulated by the catalyst system. For an economically useful process catalyst systems having a selective action are required which lead exclusively or almost exclusively to the formation of the desired polymers.

A process has become known (British Pat. No. 895,595) according to which the selectivity of catalysts of the aforesaid type can be considerably improved with respect to the formation of polymers with high content of isotactic fraction by subjecting the reaction product of $TiCl_4$ and halogen-containing aluminum-organic compounds to a thermal treatment at a temperature in the range of from 40° to 150° C and after the treatment optionally washing the product several times with an inert solvent. This heat-treated and washed catalyst is then activated in the olefin polymerization with fresh diethyl aluminum monochloride. The efficiency of the heat-treated catalysts can be further improved by effecting the thermal treatment in the presence of complex forming compounds or compounds forming double salts, for example ethers and sodium chloride.

It is a primary object of this invention to provide a process for the manufacture of a catalyst suitable for olefin polymerization by reacting titanium tetrachloride in an inert hydrocarbon solvent with an aluminum-organic compound containing an aluminum dialkyl chloride, thermally treating the $TiCl_3$ containing reaction product in the presence of an ether, separating and washing the reaction product (component A) and mixing it with an aluminum dialkyl halide (component B) and optionally with a cyclopolyene (component C) as stereoregulator, which comprises adding the aluminum-organic compound containing aluminum dialkyl chloride to the $TiCl_4$ at a temperature of from −20° to +20° C in a molar proportion of aluminum dialkyl chloride to $TiCl_4$ of from 0.8 : 1 to 1.5 to 1, subjecting the $TiCl_3$-containing solid reaction product to a thermal treatment at a temperature of from 40° to 150° C, effecting a further thermal treatment in the presence of a dialkyl ether and of a cyclopolyene and optionally subjecting the reaction product to an after-treatment with an aluminum alkyl halide, optionally in the presence of a small amount of a cyclopolyene and/or an olefin.

The invention also relates to the catalyst prepared by the aforedescribed process and to its use in the polymerization of α-olefins.

To prepare the catalyst in accordance with the invention titanium tetrachloride is first reacted in an inert hydrocarbon solvent with an aluminum-organic compound containing an aluminum dialkyl chloride.

The aluminum-organic compound containing an aluminum dialkyl chloride to be used is either an aluminum dialkyl chloride carrying alkyl groups with 1 to 6 carbon atoms, preferably aluminum diethyl chloride, dipropyl chloride, diisopropyl chloride, diisobutyl chloride, more preferably aluminum diethyl chloride, or an aluminum alkyl sesquichloride, i.e. an equimolecular mixture of aluminum dialkyl monochloride and aluminum alkyl dichloride, preferably aluminum ethyl sesquichloride, propyl sesquichloride, isopropyl sesquichloride or isobutyl sesquichloride, aluminum ethyl sesquichloride being particularly preferred.

In the reaction of titanium tetrachloride and the aluminum-organic compound containing an aluminum dialkyl chloride the molar proportion of alumimun dialkyl chloride to titanium tetrachloride is in the range of from 0.8 : 1 to 1.5 : 1, preferably 0.9 : 1 to 1.1 : 1. The aluminum compound is added to the dissolved titanium tetrachloride at a temperature of from −20° to +20° C, preferably 0° to 5° C.

As solvent an alkane or cycloalkane that is liquid at the reaction temperature is preferably used, for example hexane, heptane, octane, cyclohexane, or a hydrocarbon mixture, for example a gasoline fraction boiling in the range of from 130° to 170° C. Further suitable solvents are those which are used as dispersion medium in the polymerization of α-olefins. The amount of solvent is preferably chosen in such a manner that a 40 to 60% by weight solution of the titanium tetrachloride and a 15 to 25% by weight solution of the aluminum-organic compound are used. The same solvents are also used for the following reactions.

The $TiCl_3$-containing solid reaction product formed is separated from the reaction products which are soluble in the hydrocarbon, washed with the solvent and subjected to the first thermal treatment at a temperature of from 40° to 150° C, preferably 90° to 110° C, in the form of a suspension and while stirring. This first thermal treatment can likewise be effected prior to the separation of the reaction products soluble in the hydrocarbon, i.e. in their presence. In this case, the $TiCl_3$-containing reaction product is washed with the inert hydrocarbon after the first thermal treatment. It proved advantageous to carry out the first thermal treatment in several stages at different temperatures, for example in the first stage at 80° to 95° C and in the second stage at 100° to 110° C. The duration of the first thermal treatment depends on the temperature, i.e. it lasts longer at a low temperature than at a high temperature, the treatment times preferably being in the range of from 30 to 600 minutes. The thermally treated and washed solid reaction product containing $TiCl_3$ is suspended in an inert hydrocarbon and subjected to a further thermal treatment in the presence of a dialkyl ether and a cyclopolyene.

If the solid reaction product had been separated from the mother liquor and washed, it is now again suspended in the solvent in an amount such that the concentration of titanium in the suspension is in the range of from 0.5 to 2.5 moles of $TiCl_3$, preferably 1.5 to 2.5 moles, per liter of solvent. The second thermal treatment is carried out at a temperature of from 40° to 150° C, preferably 40° to 120° C and especially 60° to 90° C. Suitable dialkyl ethers are those having from 2 to 5 carbon atoms in each alkyl group, for example diethyl ether, di-n-propyl ether, diisopropyl ether, di-n-butyl ether, diisobutyl ether, preferably di-n-butyl ether. The molar proportion of titanium trichloride to dialkyl ether in the thermal treatment is preferably in the range of from 1 : 0.6 to 1 : 1.2, more preferably 1 : 0.9 to 1 : 1.

Suitable cyclopolyenes are norcaradiene and those having 7 ring members and 3 non cumulated double bonds in the ring as well as those having 8 ring members and 3 or 4 non cumulated double bonds in the ring, preferably cycloheptatriene-1,3,5, cyclooctatriene-1,3,5, and cyclooctatetraene-1,3,5,7, as well as the alkyl- and alkoxy-substituted derivatives thereof in which the alkyl group contains from 1 to 4 carbon atoms, cycloheptatriene-1,3,5 being preferred. The molar proportion of titanium trichloride to cyclopolyene is in the range of from 1 : 0.001 to 1 : 0.15, preferably 1 : 0.005 to 1 : 0.08 and especially 1 : 0.05 to 1 : 0.1.

The dialkyl ether is added to the suspension of the solid reaction product or vice versa. In the second heat treatment the dialkyl ether can be dissolved in a solvent, it is more advantageous, however, not to dilute it. The dialkyl ether is added to the solid suspension or the solid suspension to the dialkyl ether at the temperature of the second heat treatment over a period of a few seconds to 5 hours, preferably 1 to 30 minutes. Prior to the addition of the cyclopolyene the suspension is preferably treated first with the ether alone for 1 to 45 and advantageously 5 to 30 minutes. After mixing of the reaction components, the mixture is stirred for 5 to 300 and preferably 30 to 60 minutes at the temperature of this thermal treatment.

After the second thermal treatment the $TiCl_3$-containing reaction product is thoroughly washed with a hydrocarbon solvent.

The solid reaction product may then be treated in suspension at a concentration of 0.001 to 0.5 mole of $TiCl_3$, preferably 0.05 to 0.1 mole $TiCl_3$ per liter solvent with an aluminum alkyl halide. To this effect aluminum alkyl halides of the formula $AlR_nX_{3-n}$ in which R stands for an alkyl radical having from 2 to 8 carbon atoms, X represents a halogen atom and $n$ is a number in the range of from 1 to 2 can be used, for example aluminum dialkyl halides, aluminum alkyl dihalides, and aluminum alkyl sesquihalides, more particularly aluminum diethyl chloride, aluminum ethyl dichloride and aluminum ethyl sesquichloride. A very economic method consists in using the mother liquor obtained in the preparation of the $TiCl_3$-containing reaction product and preponderantly containing aluminum alkyl dichlorides.

The molar proportion of aluminum alkyl halide to $TiCl_3$ in the suspension to be treated is in the range of from 0.8 : 1 to 10 : 1 and preferably 1 : 1 to 5 : 1 and the treatment is carried out at a temperature of from 0° to 60° C, preferably 20° to 40° C while stirring.

The after-treatment with the alkyl aluminum halide is preferably carried out in the presence of a small amount of a cyclopolyene. Suitable cyclopolyenes are norcaradiene and those having 7 ring members and 3 non cumulated double bonds in the ring as well as those having 8 ring members and 3 or 4 non cumulated double bonds in the ring, preferably cycloheptatriene-1,3,5, cyclooctatriene-1,3,5, and cyclooctatetraene-1,3,5,7, as well as the alkyl- and alkoxy-substituted derivatives thereof in which the alkyl group contains from 1 to 4 carbon atoms, cycloheptatriene-1,3,5 being preferred. The molar proportion of titanium trichloride to cyclopolyene is in the range of from 1 : 0.001 to 1 : 1, preferably 1 : 0.005 to 1 : 0.8 and more preferably 1 : 0.075 to 1 : 0.5.

When the after-treatment with an aluminum alkyl halide is carried out in the presence of a cyclopolyene the addition of a third catalyst component (component C) in the polymerization can wholly or partially be dispensed with.

The after-treatment with the aluminum alkyl halide can also be carried out in the presence of a small amount of an olefin, either in the presence or in the absence of a cyclopolyene as defined above. There can be used monoolefins having from 2 to 10 carbon atoms, preferably ethylene, propylene, butene-1, or 4-methylpentene-1. The molar proportion of titanium trichloride to olefin is in the range of from 1 : 1 to 1 : 100, preferably 1 : 1 to 1 : 50 and more preferably 1 : 1.5 to 1 : 20.

When the after-treatment is carried out with an aluminum alkyl dihalide or aluminum alkyl sesquihalide the catalyst component A formed must be separated from the suspension and washed with an inert hydrocarbon solvent. With the use of an aluminum dialkyl monohalide, however, the isolation and washing of component A can be dispensed with. Moveover, in the latter case the amount of catalyst component B could be reduced by the amount of aluminum dialkyl monohalide used for the after-treatment.

After separation from the solvent by decantation or filtration, the catalyst component A can be dried with the exclusion of air and humidity and then stored.

Component A is used either in the form of a suspension, for example as obtained in the after-treatment with an aluminum alkyl halide, or it is isolated, washed and suspended in an inert hydrocarbon solvent and used together with an aluminum dialkyl halide (component B) and optionally a cyclopolyene (component C) and then used for the polymerization of α-olefins. α-Olefins which can be polymerized with the catalyst of the invention are those of the formula $CH_2 = CHR$ in which R stands for an alkyl radical having from 1 to 8 carbon atoms, preferably propylene, butene-1, pentene-1, 3-methyl-butene-1, 4-methyl-pentene-1 and 3-methyl-pentene-1, propylene being preferred. The catalyst according to the invention can be used for the homopolymerization as well as for the copolymerization of mixtures of the aforesaid olefins with one another and/or with ethylene. In the copolymerization the mixture contains at least 95% by weight of one of the α-olefins and at most 5% by weight of ethylene, each time calculated on the total amount of the monomers. The catalyst is especially favorable for the polymerization of mixtures of propylene with small amounts of ethylene of from 0.5 to 5 and preferably 1.5 to 3% by weight. The catalyst of the invention can also be used for the block polymerization of the said α-olefins with one another and/or with ethylene. In this case the content of ethylene is below 25% by weight. Block polymers of propylene and ethylene are preferably made. They are characterized by a high hardness and an excellent impact strength at a temperature below 0° C.

The polymerization is carried out continuously or discontinuously in suspension or in the gaseous phase at a pressure of from 1 to 50 kg/cm², preferably 1 to 40 kg/cm².

The suspension polymerization is carried out in an inert solvent, for example a petroleum fraction poor in olefins and having a boiling point in the range of from 60° to 250° C which must be carefully freed from oxygen, sulfur compounds and humidity, or saturated aliphatic and cycloaliphatic hydrocarbons such as butane, pentane, hexane, heptane, cyclohexane, methylcyclohexane, or aromatic compounds such as benzene, toluene, and xylene. The suspension polymerization can advantageously be carried out also in the α-olefin to be polymerized, for example liquid propylene, as dispersion medium.

It is likewise possible to carry out the polymerization in the absence of a solvent in the gaseous phase, for example in a fluidized bed.

If necessary, the molecular weight of the polymer is regulated by adding hydrogen.

The amount of catalyst component A depends on the intended reaction conditions, especially temperature and pressure. In general, 0.05 to 10 mmoles of $TiCl_3$ and preferably 0.1 to 3 mmoles, are used per liter of solvent in the suspension polymerization or per liter of reactor volume in the gas phase polymerization.

Catalyst component B is an aluminum dialkyl monochloride of the formula $AlR_2Cl$ in which R is an aliphatic hydrocarbon radical having up to 8 carbon atoms, preferably aluminum diethyl monochloride. The amount of component B is chosen in such a manner that the molar proportion of component B to component A (calculated on $TiCl_3$) is in the range of from 0.5 to 1 to 100 : 1, preferably 1 : 1 to 10 : 1.

The catalyst consisting of components A and B has a high polymerization activity and a good stereospecificity which largely depends on the polymerization temperature. When, for example, propylene is polymerized at 60° C the dispersion medium contains less than 3.0% by weight of soluble fractions, calculated on the total polymer, preferably less than 2.0% by weight. At a polymerization temperature of 70° to 80° C the undesired soluble fraction increases up to 4% by weight. On the other hand, a higher polymerization temperature is desirable with respect to the dissipation of the polymerization heat.

It is known that with increasing pressure and, hence, at a higher polymerization rate, the amount of soluble fractions increases. When, for example, propylene is polymerized in liquid propylene under about 32 kg/cm² and at 70° C, up to 6% of soluble fractions are obtained.

The good stereospecificity of the catalyst at higher polymerization pressure and temperature can be further improved by using a cyclopolyene as catalyst component C, such as specified above. Component C is added to component A suitably together with component B at the beginning of polymerization. The molar proportion of component C to component A, calculated as $TiCl_3$, is in the range of from 0.1 : 1 to 1 : 1, preferably 0.2 : 1 to 0.6 : 1.

The polymerization in the presence of the catalyst of the invention is carried out at a temperature of from 20° to 120° C, preferably 50° to 90° C. Higher temperatures are also possible but in this case a higher fraction of soluble atactic polymer is formed.

By the thermal treatment according to the invention in several stages of a titanium chloride-containing reduced solid with the last stage of the thermal treatment being carried out in the presence of a dialkyl ether and optionally a cyclopolyene, a catalyst component (A) is obtained which, already in combination with an aluminum dialkyl halide as activator (component B), considerably increases the polymerization rate of α-olefins with improved stereospecificity. As compared to the state of the art as disclosed in British Specification 895,595, the catalyst activity is over 100% higher at the same polymerization temperature and pressure with an equally good stereospecificity. Owing to the higher catalyst activity (g Polymer per g catalyst) the same space-time-yield can be obtained with a smaller amount of catalyst, whereby the further processing of the polymer is considerably facilitated or a processing under like conditions ensures a more efficient removal of the catalyst. When the polymerization is carried out under elevated pressure, for example above 20 kg/cm², either in the gaseous phase or in liquid α-olefin, for example liquid propylene, the yields obtained are so high that a catalyst removal can be dispensed with (more than 1,000 g polymer per millimole $TiCl_3$).

The following examples illustrate the invention.

EXAMPLE 1

A. Preparation of catalyst

A 1. Reduction of $TiCl_4$ with aluminum ethyl sesquichloride

A 10 liter vessel with stirrer was charged, with the exclusion of air and humidity, with 1090 ml of a hydrogenated, oxygen-free gasoline fraction (b.p. 140° – 165°) and 550 ml titanium tetrachloride (5 moles) and at 0° C a solution of 1111.2 g of aluminum sesquichloride (containing 4.5 moles aluminum diethyl monochloride) in 3334 g of the gasoline fraction were added dropwise while stirring (250 rev/min) over a period of 8 hours under nitrogen. A redbrown fine precipitate separated. The mixture was stirred for 2 hours at 0° C and for 12 hours at room temperature.

The suspension was heated for 4 hours to 90° C and for 6 hours to 110° C. After settling the precipitate was separated from the mother liquor by decantation and washed five times, each time with 2,000 ml of the gasoline fraction. The washed solid reaction product was suspended again in the gasoline fraction and the suspension adjusted to a concentration of 2 moles $TiCl_3$/liter. The content of trivalent titanium in the suspension was determined by titration with a Ce-IV solution.

A 2. Second thermal treatment in the presence of di-n-butyl ether

In a 2 liter vessel with stirrer 500 ml of the 2-molar suspension (corresponding to 1 mole $TiCl_3$) were heated to 80° C with the exclusion of air and humidity and under nitrogen and at said temperature 161 ml di-n-butyl ether (0.95 mole) were added dropwise while stirring within 30 minutes. The suspension was then maintained for 1 hour at 80° C. On adding the ether the mother liquor turned olive green. Finally, the solid $TiCl_3$-containing reaction product was washed 5 times, each time with 500 ml of the gasoline fraction.

A 3. After-treatment with aluminum diethyl monochloride 1 mmole of the $TiCl_3$-containing reaction product A obtained according to (A 1) and (A 2) and 2 mmoles of aluminum diethyl monochloride were added, with the exclusion of air and humidity, to 100 ml of the gasoline fraction and the mixture was stirred for 1 hour at room temperature.

B. Polymerization of propylene

A 1 liter glass autoclave was charged, with the exclusion of air and humidity, with 0.4 l of a hydrogenated, oxygen-free gasoline fraction (b.p. 140° – 165° C) and the hydrocarbon was saturated with propylene at 55° C. 2 mmoles of aluminum diethyl monochloride (activator, component B) and 0.2 mmole cycloheptatriene-1,3,5 (component C) and then the after-treated TiCl₃suspension obtained according to A 3) (1 mmole) were added. Hydrogen was introduced until a pressure of 0.25 kg/cm² had been reached and during the course of 5 minutes propylene was introduced to build up a total pressure of 6 kg/cm². This pressure was maintained during the course of polymerization by adding propylene. After a time of polymerization of 2 hours the pressure in the autoclave was released and the polymer suspension was filtered off with suction. The filter cake was washed with 1 liter of hot solvent (70° C) and dried under reduced pressure at 70° C. 248 g of propylene insoluble in the dispersion medium were obtained. The apparent density of the freely flowing pulverulent polymer was 560 g/l, the RSV value was 2.6 dl/g and the ball indentation hardness 840 kg/cm² (DIN 53 456). To determine the soluble fraction (atactic polymer) formed the polymerization mother liquor and the wash solutions were combined and evaporated to dryness under reduced pressure. 1.4 g of soluble polypropylene were found (0.57%, calculated on total polymer).

EXAMPLE 2

A. After-treatment of the TiCl₃-containing reaction product with Al(C₂H₅)₂Cl and cycloheptatriene-1,3,5.

1 mmole (TiCl₃) of the reaction product prepared according to Example 1, (A 1) and (A 2), 2 mmoles aluminum diethyl monochloride and 0.2 mmole cycloheptatriene-1,3,5 were added, with the exclusion of air and humidity, to 100 ml of the gasoline fraction and the mixture was stirred for 1 hour at room temperature.

B. Polymerization of propylene

The polymerization was carried out under the conditions specified in Example 1 with the exception, however, that no further amount of cycloheptatriene-1,3,5 was added. 230 g of polypropylene insoluble in the dispersion medium and having an apparent density of 553 g/l, an RSV value of 2.2 dl/g and a ball indentation hardness of 850 kg/cm² (DIN 53 456) were obtained. The mother liquor contained 0.5% of atactic polymer, calculated on the total polymer.

EXAMPLE 3

A. After-treatment of the TiCl₃-containing reaction product with Al(C₂H₅)₂Cl and cyclooctatetraene-1,3,5,7

The after-treatment was carried out as described in Example 2 with the exception that cyclooctatetraene-1,3,5,7 was used instead of cycloheptatriene-1,3,5. With the exclusion of air and humidity 1 mmole (TiCl₃) of the olive green suspension of Example 1 (A 2), 0.2 mmole of cyclooctatetraene-1,3,5,7 and 2 mmoles aluminum diethyl monochloride were added to 100 ml of the gasoline fraction and the mixture was stirred for 1 hour at room temperature.

B. Polymerization of propylene

Propylene was polymerized under the conditions of Example 1. 252 g. of polypropylene insoluble in the dispersion medium and having an apparent density of 540 g/l, an RSV value of 2.1 dl/g and a ball indentation hardness of 830 kg/cm² (DIN 53 456) were obtained. The fraction of soluble polypropylene amounted to 1.2 g = 0.47%, calculated on the total polymer.

EXAMPLE 4

The TiCl₃-containing reaction product was prepared as described in Example 1 sub (A 1) and (A 2) and subjected to an after-treatment with aluminum diethyl monochloride and cycloheptatriene-1,3,5 in the presence of an olefin as follows:

100 mmoles of the TiCl₃ suspension of Example 1, A 2), were diluted to 0.1 mole TiCl₃ per liter dispersion medium by adding about 800 ml of the gasoline fraction and, with the exclusion of air and humidity, 500 mmoles Al(C₂H₅)₂Cl (62.92 ml) and 40 mmoles cycloheptatriene-1,3,5 (4.16 ml) were added and the mixture was stirred for 5 minutes at room temperature. At room temperature (with cooling) 300 mmoles (12.6 g) of gaseous propylene (6.7 l) were then introduced over a period of 1 hour. To avoid the formation of a vacuum the propylene was diluted with a small amount of argon. Subsequently, the TiCl₃-containing suspension was stirred for 1 hour at room temperature and under argon. The content of trivalent titanium (as TiCl₃) was determined by titration with a Ce-IV solution.

A 1 liter glass autoclave was charged, with the exclusion of air and humidity, with 0.5 l of a hydrogenated, oxygen-free gasoline fraction (b.p. 140° –165° C) and the hydrocarbon was saturated with propylene at 70° C. 1 mmole of the above suspension (10.9 ml) was added and hydrogen was introduced in an amount such that a pressure of 0.25 kg/cm² was reached. Over a period of 5 minutes propylene was then introduced until a total pressure of 6 kg/cm² had built up. This pressure was maintained during the course of polymerization by introducing propylene. Simultaneously, the temperature was increased to 80° C and maintained at said level by cooling. After a polymerization period of 2 hours the pressure in the autoclave was released and the polymerization mixture was worked up as described in Example (1 B). 230 g of polypropylene insoluble in the dispersion medium were obtained in the form of translucent grains. The RSV value was 2.2 dl/g, the apparent density 542 g/l and the ball indentation hardness 860 kg/cm² (DIN 53 456). In the mother liquor 5 grams of soluble atactic polypropylene were found, corresponding to 2.1% by weight, calculated on the total polymer.

EXAMPLE 5

Polymerization of propylene in the liquid monomer

A 16 l enamelled vessel provided with stirrer, jacket heating and gas inlet was flushed at room temperature with pure nitrogen and then with propylene. A pressure of 0.5 kg/cm² was built up by introducing hydrogen and through a valve a solution of 20 mmoles Al(C₂H₅)₂Cl in 6 l of liquid propylene were added. Then through another valve 4 mmoles (as TiCl₃) of the suspension of component A of Example 4, containing 20 mmoles Al(C₂H₅)₂Cl, 1.6 mmoles cycloheptatriene-1,3,5 and a small amount of polypropylene, diluted with 6 l of liquid propylene were added. The polymerization mixture was heated to 70° C whereby the pressure rose to 32 kg/cm². The internal temperature was maintained at 70° C by cooling. The polymerization started after a few minutes. The experiment was interrupted after 3 hours by pressure release. After drying, 4 kg of freely flowing polymer were obtained having an apparent density of 545 g/l. The polymer grains were translucent, the RSV value was found to be 1.9 dl/g. By a 16 hour extraction with heptane a soluble fraction of 2.8% by weight was found. The product had a ball indentation hardness of 780 kg/cm$^2$ (DIN 53 456).

EXAMPLE 6

5 mmoles (TiCl$_3$) of the reaction product according to Example 1, (A 1) and (A 2), were suspended, with the exclusion of air and humidity, in 500 ml of the gasoline fraction and 10 mmoles aluminum diethyl monochloride and 1 mmole cycloheptatriene-1,3,5 were added. The reaction mixture was then stirred for 1 hour at room temperature.

A 2 liter vessel with stirrer, thermometer and gas inlet was charged with 1 l of the hydrogenated, oxygen-free gasoline fraction (b.p. 140° –165° C) and flushed with pure nitrogen. At a temperature of 50° C the suspension described above was added and 200 g of 4-methylpentene-1 were dropped in over a period of 3 hours. The polymerization temperature was maintained at 55° C. The polymerization set in after a few minutes. The polymer separated in the form of a fine precipitate. When the dropwise addition was terminated the mixture was stirred for another 2 hours at 55° C. Thereafter, the polymerization was interrupted by adding 50 ml isopropanol, the mixture was stirred for 1 hour at 60° C, extracted with warm water and filtered off with suction while still hot. After thorough washing with hot gasoline and acetone and drying under reduced pressure at 70° C, 194 g of colorless poly-4-methylpentene-1 were obtained. The polymer had an apparent density of 515 g/l. The mother liquor contained 0.6% by weight of soluble polymer.

EXAMPLE 7

A. Preparation of catalyst

A 1. Reduction of TiCl$_4$ by means of aluminum ethyl sesquichloride 1090 ml of a hydrogenated, oxygen-free gasoline fraction (b.p. 140° – 165° C) and 550 ml of titanium tetrachloride (5 moles) were introduced into a 10 liter vessel with stirrer, air and humidity being excluded, and at 0° C a solution of 1111.2 g aluminum ethyl sesquichloride containing 4.5 moles aluminum diethyl monochloride in 3334 g of the gasoline fraction were added dropwise over a period of 8 hours while stirring (250 rev/min) under nitrogen. A red-brown fine precipitate separated. The reaction mixture was stirred for 2 hours at 0° C and then for 12 hours at room temperature.

Then, the suspension was heated for 4 hours at 90° C and for another 6 hours at 110° C. The separated precipitate was allowed to settle and the supernatant mother liquor was removed by decantation. The solid reaction product was washed five times, each time with 2000 ml of the gasoline fraction, suspended in the gasoline fraction and the suspension was adjusted to a concentration of 2 moles TiCl$_3$/liter. The content of trivalent titanium in the suspension was determined by titration with a Ce-IV solution.

A 2. Second thermal treatment in the presence of di-n-butyl ether and cycloheptatriene-1,3,5

In a 2 liter vessel with stirrer 500 ml of the 2-molar suspension (corresponding to 1 mole TiCl$_3$) were heated to 80° C with the exclusion of air and humidity and under nitrogen and at said temperature 161 ml di-n-butyl ether (0.95 mole) were added dropwise while stirring over a period of 30 minutes. The suspension was maintained for 30 minutes at 80° C and at said temperature 75 mmoles cycloheptatriene-1,3,5 (7.8 ml) were added and the mixture was stirred for a further 4 hours at 80° C. On adding the ether the mother liquor turned olive green. The solid TiCl$_3$-containing reaction product was then washed five times, each time with 500 ml of the gasoline fraction.

A 3. After-treatment with aluminum diethyl monochloride 1 mmole (TiCl$_3$) of the reaction product according to (A 1) and (A 2) and 2 mmoles of aluminum diethyl monochloride were added, with the exclusion of air and humidity, to 100 ml of the gasoline fraction and the mixture was stirred for 1 hour at room temperature.

B. Polymerization of propylene

A 1 liter glass autoclave was charged, with the exclusion of air and humidity, with 0.4 l of the hydrogenated, oxygen-free gasoline fraction (b.p. 140° –165° C) and the hydrocarbon was saturated with propylene at 55° C. 2 mmoles of aluminum diethyl monochloride (component B, activator) and 0.2 mmole cycloheptatriene-1,3,5 (component C) and then the after-treated TiCl$_3$ (1 mmole) suspension according to A 3) were added. Hydrogen was introduced until a pressure of 0.25 kg/cm$^2$ had been reached and then propylene was introduced within 5 minutes in an amount to build up a total pressure of 6 kg/cm$^2$. This pressure was maintained during polymerization by adding propylene. After a polymerization time of 2 hours, the pressure in the autoclave was released, the polymer suspension was filtered off with suction, the filter cake was washed with 1 l of hot solvent (70° C) and dried at 70° C under reduced pressure. 228 g of polypropylene insoluble in the dispersion medium were obtained. The freely flowing pulverulent polymer had an apparent density of 545 g/l, an RSV vlaue of 2.1 dl/g, and a ball indentation hardness of 850 kg/cm$^2$ (DIN 53 456). To determine the soluble fraction formed in the polymerization (atactic polypropylene) the mother liquor and the wash solutions were combined and evaporated to dryness under reduced pressure. 1.2 g of soluble polypropylene were found, corresponding to 0.52 %, calculated on the total polymer.

EXAMPLE 8

A. After-treatment of the TiCl$_3$-containing reaction product with Al(C$_2$H$_5$)$_2$Cl and cycloheptatriene-1,3,5

1 mmole (TiCl$_3$) of the reaction product obtained according to Example 7, (A 1) and (A 2), 2 mmoles aluminum diethyl monochloride and 0.2 mmole cycloheptatriene-1,3,5 were added, with the exclusion of air and humidity, to 100 ml of the gasoline fraction and the mixture was stirred for 1 hour at room temperature.

B. Polymerization of propylene

The polymerization was carried out under the conditions specified in Example 7, with the exception, however, that no cycloheptatriene-1,3,5 was added. 228 g of polypropylene insoluble in the dispersion medium were obtained. The product had an apparent density of 543 g/l, an RSV value of 2 dl/g, and a ball indentation hardness of 855 kg/cm$^2$ (DIN 53 456). The mother liquor contained 0.55% of atactic fraction, calculated on the total polymer.

EXAMPLE 9

A. After-treatment of the TiCl$_3$-containing reaction product with Al(C$_2$H$_5$)$_2$Cl and cyclooctatetraene-1,3,5,7

The after-treatment was carried out as described in Example 8 with the use of cyclooctatetraene-1,3,5,7 instead of cycloheptatriene-1,3,5. With the exclusion of air and humidity 1 mmole (TiCl$_3$) of the olive green suspension according to Example 7, A 2), 0.2 mmole cyclooctatetraene-1,3,5,7 and 2 mmole aluminum diethyl monochloride were added to 100 ml of the gasoline fraction and the mixture was stirred for 1 hour at room temperature.

B. Polymerization of propylene

Propylene was polymerized under the conditions of Example 7, but without the addition of cycloheptatriene-1,3,5 (component C). 260 g of polypropylene insoluble in the dispersion medium were obtained having an apparent density of 538 g/l, an RSV value of 1.1 dl/g and a ball indentation hardness of 840 kg/cm$^2$ (DIN 53 456). The proportion of soluble polypropylene amounted to 1.5 g = 0.57%, calculated on the total polymer.

EXAMPLE 10

The TiCl$_3$-containing reaction product was prepared as described in Example 7, (A 1) and (A 2). The after-treatment with aluminum diethyl monochloride and cycloheptatriene-1,3,5 was carried out in the presence of an olefin as follows: 100 mmoles of the TiCl$_3$ suspension were diluted to about 0.1 mole TiCl$_3$ per liter by adding about 800 ml of the gasoline fraction and, with the exclusion of air and humidity, 500 mmoles Al(C$_2$H$_5$)$_2$Cl (62.92 ml) and 40 mmoles cycloheptatriene-1,3,5 (4.16 ml) were added and the mixture was stirred for 5 minutes at room temperature. Then, 300 mmoles (12.6 g) gaseous propylene (6.7 l) were introduced at room temperature (cooling) over a period of 1 hour. To avoid the formation of a vacuum the propylene was diluted with a small amount of argon. The catalyst suspension was then stirred for 1 hour at room temperature and under argon. The content of trivalent titanium was determined by titration with a Ce-IV solution.

A 1 liter glass autoclave was charged, with the exclusion of air and humidity, with 0.5 l of a hydrogenated, oxygen-free gasoline fraction (b.p. 140° – 165° C) and the hydrocarbon was saturated with propylene at 70° C. 1 mmole of the above suspension (10.9 ml) was added, hydrogen was introduced until a pressure of 0.25 kg/cm$^2$ had been reached and then within 5 minutes propylene was introduced in such an amount that a total pressure of 6 kg/cm$^2$ was built up. This pressure was maintained during the course of the polymerization by introducing propylene. Simultaneously, the temperature was raised to 80° C and maintained at said level by cooling. After a time of polymerization of 2 hours the pressure in the autoclave was released. The polymerization mixture was further processed as described in Example (1 B). 225 g of polypropylene insoluble in the dispersion medium were obtained in the form of translucent grains having an RSV value of 2.5 dl/g, an apparent density of 548 g/l and a ball indentation hardness of 830 kg/cm$^2$ (DIN 53 456). The mother liquor contained 4.5 g of soluble atactic polypropylene, corresponding to 1.96% by weight, calculated on the total polymer.

EXAMPLE 11

Polymerization of propylene in the liquid monomer

A 16 liter enamelled vessel provided with stirrer, jacket heating and gas inlet was flushed at room temperature with pure nitrogen and then with propylene. By the introduction of hydrogen a pressure of 0.5 kg/cm$^2$ was built up and through a valve a solution of 20 mmoles Al(C$_2$H$_5$)$_2$Cl in 6 l of liquid propylene and through another valve thereafter 4 mmoles (as TiCl$_3$) of the suspension according to Example 10 (component A) containing 20 mmoles Al(C$_2$H$_5$)$_2$Cl, 1.6 mmoles cycloheptatriene-1,3,5 and a small amount of polypropylene diluted with 6 l of liquid propylene were added. The polymerization mixture was heated to 70° C whereby the pressure rose to 32 kg/cm$^2$. The internal temperature was maintained at 70° C by cooling. Polymerization started after a few minutes and was interrupted after 3 hours by releasing the pressure of the autoclave. After drying, 3.8 kg of a freely flowing polymer were obtained having an apparent density of 545 g/l. The polymer grain was translucent. The RSV value was 2.2 dl/g. By a 16 hour extraction with heptane a soluble fraction of 3% by weight was found. The ball indentation hardness was found to be 760 kg/cm$^2$ (DIN 53 456).

EXAMPLE 12

With the exclusion of air and humidity, 5 mmoles (TiCl$^3$) of the reaction product according to Example 7, A 1) and A 2), were suspended in 500 ml of the gasoline fraction and then 10 mmoles aluminum diethyl monochloride and 1 mmole cycloheptatriene-1,3,5 were added and the mixture was stirred for 1 hour at room temperature.

A 2 liter vessel provided with stirrer, thermometer and gas inlet was charged with 1 liter of a hydrogenated, oxygen-free gasoline fraction (b.p. 140° – 165° C) and the vessel was flushed with pure nitrogen. At a temperature of 50° C the above suspension of component A was added and 200 g of 4-methylpentene-1 were added dropwise over a period of 3 hours. The polymerization started after a few minutes. The polymerization temperature was maintained at 55° C. The polymer separated in the form of a fine precipitate. When the dropwise addition was terminated, the mixture was stirred for another 2 hours at 55° C, whereupon the polymerization was interrupted by adding 50 ml isopropanol, the mixture was stirred for 1 hour at 60° C, extracted with warm water and filtered off with suction while still hot. After thorough washing with hot solvent (gasoline) and acetone and drying at 70° C under reduced pressure, 190 g of colorless poly-4-methylpentene-1 were obtained. The polymer had an apparent density of 505 g/l. The mother liquor contained 0.7% by weight of soluble fraction.

What is claimed is:

1. In a process for the manufacture of a catalyst which comprises reacting titanium tetrachloride in an inert hydrocarbon solvent with an aluminum-organic compound containing an aluminum dialkyl chloride at a temperature of −20° to +20° C and in a molar proportion of aluminum dialkyl chloride to TiCl$_4$ of 0.8 : 1 to 1.5 : 1, thermally treating the TiCl$_3$-containing reaction product at a temperature of 40° to 150° C, separating and washing the reaction product (component A), and mixing it with an aluminum dialkyl halide (component B), the improvement which comprises effecting a further thermal treatment, of component A, at from 40° to 150° C in the presence of a dialkyl ether and a cyclopolyene in a molar ratio of from 1 : 0.001 to 1 : 0.15 of TiCl$_3$ to cyclopolyene.

2. A catalyst prepared by the process of claim 1.

3. The process of claim 1 wherein component A is after-treated in an inert hydrocarbon diluent with an aluminum alkyl halide, at a molar proportion of aluminum alkyl halide to trichloride of 0.8 : 1 to 10 : 1 and at a temperature of 0° to 60° C.

4. The process of claim 1 wherein the inert hydrocarbon diluent is a member selected from the group consisting of hexane, heptane, octane, cyclohexane, a gasoline fraction boiling in the range of from 130° to 170° C and mixtures thereof.

5. The process of claim 1 wherein component A is after-treated at about ambient temperature with an aluminum alkyl halide having the formula $AlR_nX_{3-n}$, wherein R is an alkyl having from 2 to 8 carbon atoms, X is a halogen and $n$ is 1 to 2, and with a cyclopolyene selected from the group consisting of cycloheptatriene −1, 3, 5, cyclooctatriene −1, 3, 5 and cyclooctatetraene −1, 3, 5, 7 and alkyl and alkoxy substituted derivatives thereof in which the alkyl group contains 1 to 4 carbon atoms.

6. The process of claim 5 where in the after-treatment a mono-olefin having from 2 to 10 carbon atoms is added.

7. In a process for the manufacture of a catalyst which comprises reacting titanium tetrachloride in an inert hydrocarbon solvent with an aluminum-organic compound containing an aluminum dialkyl chloride at a temperature of −20° to +20° C and in a molar proportion of aluminum dialkyl chloride to $TiCl_4$ of 0.8 : 1 to 1.5 : 1, thermally treating the $TiCl_3$-containing reaction product at a temperature of 40° to 150° C, separating and washing the reaction product (component A), and mixing it with an aluminum dialkyl halide (component B), the improvement which comprises effecting a further thermal treatment, of component A, at from 40° to 150° C in the presence of a dialkyl ether, and then subjecting component A to an after-treatment with an aluminum alkyl halide at a temperature of from 0° to 60° C in a molar ratio of aluminum alkyl halide to $TiCl_3$ of from 0.8 : 1 to 10 : 1.

8. The process of claim 7 where in the further thermal treating step a cyclopolyene is present with the dialkyl ether.

9. The process of claim 8 wherein the first thermal treatment is carried out in two steps, first at a temperature of 80° to 95° C and second at a temperature of 100° to 110° C.

10. The process of claim 7, wherein component A is after-treated in an inert hydrocarbon diluent with said aluminum alkyl halide in the presence of an unsaturated compound selected from the group consisting of cyclopolyenes, olefins, and mixtures thereof at $TiCl_3$/unsaturated compound ratios of from 1 : 0.001 to 1 : 1 for the cyclopolyenes present and from 1 : 1 to 1 : 100 for the olefins present.

11. The process of claim 10 wherein the unsaturated compound is with an aluminum alkyl halide and a cyclopolyene.

12. The process of claim 11, wherein the thermal treatment in the presence of a dialkyl ether lasts for a few seconds to five hours.

13. The process of claim 12, wherein component A is suspended in an inert hydrocarbon diluent during the thermal treatment in the presence of the dialkyl ether by an amount of 0.5 to 2.5 mols $TiCl_3$ per liter.

14. The process of claim 10 wherein the unsaturated compound includes both cyclopolyene and olefin.

15. The process of claim 7 wherein component A is reacted with an aluminum alkyl chloride which is a member selected from the group consisting of aluminum dialkyl chloride, aluminum mono alkyl dichloride and aluminum alkyl sesqui-chloride, said alkyl group each containing 1 to 6 carbon atoms.

16. The process of claim 7 wherein said further treating step is carried out with a dialkyl ether which is a member selected from the group consisting of dialkyl ethers containing 2 to 5 carbon atmos in each alkyl group.

17. A catalyst produced by the process of claim 7.

* * * * *